United States Patent
Skszek et al.

(10) Patent No.: US 8,062,715 B2
(45) Date of Patent: Nov. 22, 2011

(54) FABRICATION OF ALLOY VARIANT STRUCTURES USING DIRECT METAL DEPOSITION

(76) Inventors: Timothy W. Skszek, Saline, MI (US);
Matthew T. J. Lowney, Novi, MI (US);
Dwight Morgan, Rochester Hills, MI (US)

( * ) Notice: Subject to any disclaimer, the term of this patent is extended or adjusted under 35 U.S.C. 154(b) by 1929 days.

(21) Appl. No.: 11/140,752

(22) Filed: May 31, 2005

(65) Prior Publication Data

US 2005/0224209 A1   Oct. 13, 2005

Related U.S. Application Data

(63) Continuation of application No. 09/851,601, filed on May 9, 2001, now abandoned, and a continuation-in-part of application No. 09/670,670, filed on Sep. 27, 2000, now Pat. No. 6,472,029, which is a continuation-in-part of application No. 09/570,986, filed on May 15, 2000, now Pat. No. 6,410,105.

(60) Provisional application No. 60/202,590, filed on May 9, 2000.

(51) Int. Cl.
*B22C 3/00* (2006.01)
*B05D 3/06* (2006.01)
*B23K 26/32* (2006.01)
*B23K 26/34* (2006.01)

(52) U.S. Cl. ........ 427/556; 427/559; 427/597; 427/135; 219/121.64; 219/121.85

(58) Field of Classification Search .................... None
See application file for complete search history.

(56) References Cited

U.S. PATENT DOCUMENTS

| | | | |
|---|---|---|---|
| 4,323,756 A | 4/1982 | Brown et al. | 219/121 LF |
| 4,724,299 A | 2/1988 | Hammeke | 219/121 L |
| 4,777,002 A | 10/1988 | Putz | 264/226 |
| 4,966,225 A | 10/1990 | Johnson et al. | 164/519 |
| 5,062,786 A | 11/1991 | Arai | 425/174 |
| 5,189,781 A | 3/1993 | Weiss et al. | 29/527.2 |
| 5,208,431 A | 5/1993 | Uchiyama et al. | 219/121.65 |
| 5,409,537 A | 4/1995 | Poullos et al. | 118/669 |
| 5,659,479 A | 8/1997 | Duley et al. | 700/166 |

(Continued)

OTHER PUBLICATIONS

Thompson, Steve, Handbook of Mold, Tool and Die Repair Welding William Andrew Publishing, 1999, p. 22-36.

*Primary Examiner* — Marianne L Padgett
(74) *Attorney, Agent, or Firm* — Gifford, Krass, Sprinkle, Anderson & Citkowski, P.C.

(57) ABSTRACT

Direct-metal deposition (DMD), preferably under closed-loop control, is used to fabricate alloy-variant material structures which provide a combination of desirable physical and mechanical properties. Use of the invention facilitates the production of high-strength, high-wear, and impact-resistant structures which decrease the likelihood of erosion, heat checking and brittle failure in injection molds, die casting, thixomolding and other, more exotic tooling. The invention uses DMD to deposit a first material or alloy in an area exposed to high wear, such as the tooling gate area, with a second material or alloy being used elsewhere in the tool for greater impact resistance. Advantageously, the areas may be of a user-defined thickness to further improve longevity. The resulting composite material structure has mechanical properties (i.e., yield strength, hardness and abrasion resistance) which exceed that of the homogeneous compositions currently used for mold materials, thereby enhancing productivity while improving part quality in these and other applications.

7 Claims, 2 Drawing Sheets

U.S. PATENT DOCUMENTS

| | | | | |
|---|---|---|---|---|
| 5,837,960 | A | 11/1998 | Lewis et al. | 219/121.63 |
| 5,875,830 | A | 3/1999 | Singer et al. | 164/19 |
| 5,968,603 | A * | 10/1999 | Urbanek et al. | 427/448 |
| 6,046,426 | A | 4/2000 | Jeantette et al. | 219/121.63 |
| 6,122,564 | A | 9/2000 | Koch et al. | 700/123 |
| 6,203,861 | B1 | 3/2001 | Kar et al. | 427/554 |
| 6,365,096 | B1 | 4/2002 | Sandberg et al. | 420/111 |
| 6,410,105 | B1 * | 6/2002 | Mazumder et al. | 427/554 |
| 6,472,029 | B1 * | 10/2002 | Skszek | 427/554 |
| 6,621,039 | B2 * | 9/2003 | Wang et al. | 219/121.6 |
| 6,623,876 | B1 * | 9/2003 | Caron | 428/698 |
| 6,656,409 | B1 * | 12/2003 | Keicher et al. | 264/401 |
| 6,861,612 | B2 * | 3/2005 | Bolton et al. | 219/121.64 |
| 6,925,346 | B1 * | 8/2005 | Mazumder et al. | 700/119 |
| 7,139,633 | B2 * | 11/2006 | Mazumder et al. | 700/123 |
| 7,286,893 | B1 * | 10/2007 | Mazumder | 700/145 |
| 7,555,822 | B2 * | 7/2009 | Bustamante et al. | 29/527.2 |
| 7,765,022 | B2 * | 7/2010 | Mazumder et al. | 700/121 |
| 2006/0218770 | A1 * | 10/2006 | Bustamante et al. | 29/527.2 |
| 2008/0000611 | A1 * | 1/2008 | Bunker et al. | 164/138 |
| 2011/0156304 | A1 * | 6/2011 | Walker et al. | 264/219 |

* cited by examiner

FABRICATION OF ALLOY VARIANT STRUCTURES USING DIRECT METAL DEPOSITION

REFERENCE TO RELATED APPLICATION

This application is a continuation of U.S. patent application Ser. No. 09/851,601, filed May 9, 2001, now abandoned, which claims priority of U.S. provisional patent application Ser. No. 60/202,590, filed May 9, 2000. U.S. patent application Ser. No. 09/851,601 is a continuation-in-part of U.S. patent application Ser. No. 09/670,670, filed Sep. 27, 2000, now U.S. Pat. No. 6,472,029, which is a continuation-in-part of U.S. patent application Ser. No. 09/570,986, filed May 15, 2000, now U.S. Pat. No. 6,410,105. The entire content of each application being incorporated herein by reference.

FIELD OF THE INVENTION

This invention relates generally to additive manufacturing processes and, in particular, to the formation of alloy variant structures using laser-assisted direct metal deposition (DMD) processes.

BACKGROUND OF THE INVENTION

In manufacturing, a critical, time-limiting step for many products is the design and fabrication of "tooling," including molds and dies. Complex dies may take from weeks to a year to perfect prior to manufacture of a product. In present manufacturing processes, added steps are necessary to overcome existing fabrication methods. For example, molds and dies must be machined to provide cooling channels and an acceptable surface finish.

Traditional materials and fabrication methods used to manufacture tooling plastic or metallic prototype or production parts, utilize homogenous wrought or cast tool steel alloy materials which, when machined, heat treated, finished and assembled, form a mold, die or other component. In many cases, the application requirements within a mold or die component differ, resulting in a reduction in die life requiring repair or replacement of the die or mold.

In an effort to facilitate the fabrication die components and/or to accommodate variations in application requirements, dies and molds often include multiple components. Each section or mold component is fabricated from a homogenous metal alloy, which results in homogenous material properties within each die or mold component. The variation in material property requirements within a mold or die component, results in localized wear or and premature failure of the mold or die component in the areas which the application requirements exceed the material properties (mechanical and physical properties) inherent to the homogenous metal alloy.

In many cases, molds or dies are assembled and comprised of component parts to achieve the need for a variation in material properties within a mold or die. For example, section and insert may be fabricated from dissimilar materials, or processed differently, as through heat treatment.

It has long been recognized that additive processes, wherein material layers are built up, could potentially be beneficial in the fabrication of tooling by eliminating multiple component parts or fabrication steps. However, known processes which deposit metal result in a sintered product, due to trapping of oxides and inadequately bonded material. One such process is laser cladding, wherein a laser is used to generate a melt-pool on a substrate material while a second material, typically a powder or wire, is introduced, melted, and metallurgically joined.

Cladding is generally distinguished from alloying on the basis that cladding melts a relatively small amount of the base substrate material relative to the amount of the deposited material, and the powder system delivers a controlled volume of metal particles into this molten volume. The particles become dispersed throughout this molten volume and form a deposition of a desired composition on the outer layer of the substrate. Removal of the laser beam from the molten volume, such as by advancement of the substrate workpiece relative to the focal point of the beam, causes the molten volume to be rapidly chilled. The chilling occurs so rapidly that the volume often retains the characteristics of the molten mix.

Conventional laser cladding techniques move the metal article relative to the focal point through the use of jigs, parts handlers, and the like. The beam focal point therefore remains fixed in space, as does the powdering point. Uniform movement of the metal article usually requires a complicated jig which is difficult to manufacture, very expensive, and usually not very successful, particularly with intricate geometries. For this reason, laser cladding of metal parts having other than relatively flat geometries have been nearly impossible to achieve on a consistent uniform basis.

Close control of dimensions is necessary for the production of parts and tools having close tolerances, acceptable microstructures and properties, and which can be produced at a reasonable cost and within a reasonable period of time. A solution to the problem involves the use of feedback-controlled, direct metal deposition (DMD) as described in U.S. Pat. No. 6,122,564, the entire contents of which are incorporated herein by reference. With DMD, a laser is used to locally heat a spot on a substrate, forming a melt pool into which powder is fed to create a deposit having a physical dimension. Optical detection means, coupled to an optoelectric sensor, are used to monitor the physical dimension of the deposit, and a feedback controller is operative to adjust the laser in accordance with the electrical signal, thereby controlling the rate of material deposition.

Preferably, the monitored physical dimension is the height of the deposit, and the system further includes an interface to a computer-aided design (CAD) system including a description of an article to be fabricated, enabling the feedback controller to compare the physical dimension of the deposit to the description and adjust the energy of the laser in accordance therewith.

A DMD system for automatically fabricating an article typically includes a computer-aided design database including a description of the article to be fabricated, a work table for supporting the substrate, and translation means for moving the substrate relative to the laser and a raw material feeder. In one arrangement, the worktable moves while the laser and feed means remain stationary, whereas, in a different configuration, the laser and feeder move while the work table remains stationary. As a further alternative, both the laser/material feed and work table/substrate could be moved simultaneously, preferably under feedback control.

One distinct advantage of DMD is that material composition may be varied during the deposition process. As disclosed in co-owned U.S. Pat. No. 6,472,029, DMD is used to fabricate composite material structures which provide a combination of desirable physical and mechanical properties. In particular, the use of DMD facilitates the production of high-strength, abrasion-resistant laminate structures which also exhibit a high degree of thermal conductivity. In particular, DMD is used to deposit alternate layers or rows of a thermally conductive material, such as copper or a copper alloy, and a high strength, abrasion resistant thermal barrier material, such as tool steel. The resulting composite material structure has mechanical properties (i.e., yield strength, hardness and abrasion resistance) which exceed that of pure copper or copper-based alloys required for mold materials, thereby enhancing productivity while improving part quality in these and other applications.

SUMMARY OF THE INVENTION

This invention overcomes shortcomings in the prior art through the use of direct-metal deposition (DMD) to fabricate alloy-variant material structures which provide a combination of desirable physical and mechanical properties. In particular, use of the invention facilitates the production of high-strength, high-wear, and impact-resistant structures which decrease the likelihood of erosion, heat checking and brittle failure.

Fabrication of die or mold components using the closed-loop DMD process and alloy variant materials may be used to tailor material requirements in various applications, including injection molds, die casting, thixomolding and other, more exotic tooling. Fabrication of die or mold components using the closed-loop DMD process and alloy variant materials, may be used address the local application requirements, including die component/insert configurations.

In the preferred embodiment, the invention uses DMD to deposit a first material or alloy in an area exposed to high wear, such as the tooling gate area, with a second material or alloy being used elsewhere in the tool for greater impact resistance. Advantageously, the areas may be of a user-defined thickness to further improve longevity. The resulting composite material structure has mechanical properties (i.e., yield strength, hardness and abrasion resistance) which exceed that of the homogeneous compositions currently used for mold materials, thereby enhancing productivity while improving part quality in these and other applications.

DETAILED DESCRIPTION OF THE INVENTION

Figure 1:
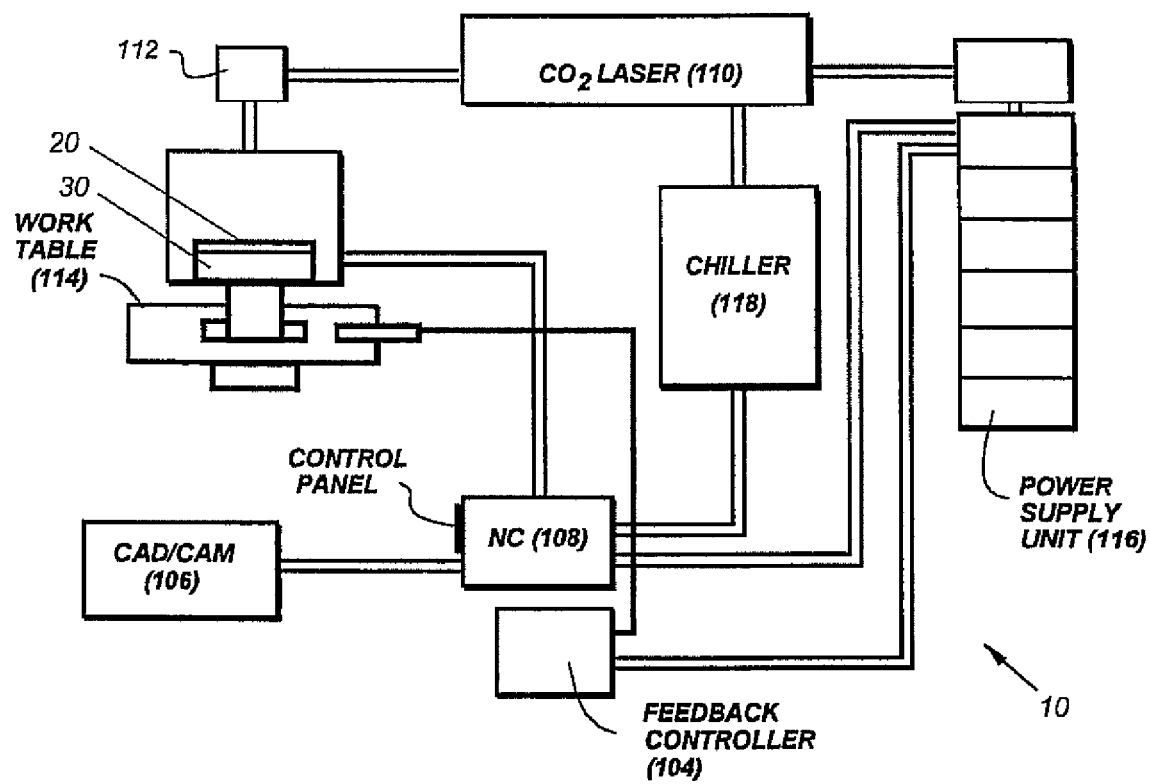
FIG. 1 is a block diagram depicting equipment associated with a DMD system applicable to the invention.

FIG. 1 illustrates a laser-aided, computer controlled direct material deposition (DMD) system in schematic form. The system 10 applies layers of material 20 on a substrate 30 to fabricate an object or cladding. As discussed above, the system is preferably equipped with feedback monitoring to control of the dimensions and overall geometry of the fabricated article. The geometry of the article is provided by a computer-aided design (CAD) system.

The deposition tool path is generated by a computer-aided manufacturing (CAM) system for computer numerical control (CNC) machining with post-processing software for deposition, instead of software for removal as in conventional CNC machining. CAM software interfaces with a feedback controller 104. These details of the laser-aided, computer controlled direct material deposition system are disclosed in U.S. Pat. No. 6,122,564, and are therefore not all explicitly shown in FIG. 1.

The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 80 of the direct material deposition system typically cooperates directly with the numerical controller 90, which, itself, controls all functions of the direct material deposition system, including laser power.

The laser source 110 of the DMD system is mounted above the substrate 30 and a layer of material 20 is deposited according to the description of the object. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

A numerical controller 108 controls all operating components of the DMD system of FIG. 1, including the operating conditions of the laser, receiving direction from the CAD/CAM system 106 for building the part or product. The numerical controller 108 also receives feedback control signals from the feedback controller 104 to adjust laser power output, and further controls the relative position of the substrate and laser spray nozzle. The CAD/CAM system 106 is equipped with software which enables it to generate a path across the substrate for material deposition.

The laser is used to locally heat a spot on a substrate, forming a melt pool into which powder is fed to create a deposit having a physical dimension such as height. As described in U.S. Pat. No. 6,122,564, the extent of the physical dimension is controlled using an optical feedback loop. Optical detection means coupled to an optoelectric sensor are used to monitor the deposit, and a feedback controller is operative to adjust the laser in accordance with the electrical signal, thereby controlling the rate of material deposition. In the preferred embodiment, the physical dimension is the height of the deposit, and the system further includes an interface to a computer-aided design (CAD) system including a description of an article to be fabricated, enabling the feedback controller to compare the physical dimension of the deposit to the description and adjust the energy of the laser in accordance therewith.

In terms of specific apparatus, the optical detection means preferably includes an apertured mask through which light from the deposit passes to reach the optoelectric sensor, and the feedback controller includes circuitry for adjusting the laser in accordance with the presence or absence of the light from the deposit. This allows the system to optically monitor the physical dimension of the deposit, and control the physical dimension in accordance with the description of the article to be fabricated. The deposition head, preferably equipped with flying optics, is advanced to different localized region of the substrate until the fabrication of the article is completed, whether a finished piece or a tool such as a mold or die.

To address variations in material property requirements within a mold or die used to produce plastic, metallic or composite material parts, DMD can be used to fabricate mold and die components featuring non-homogenous alloy variant materials.

The process may be used to fabricate die or mold component parts comprised of dissimilar materials, including multiple metal alloys or cermets (ceramic/metal composites), each tailored to meet the application requirements associated with the localized area of the mold or die component.

In the preferred embodiment, this is accomplished by blending powders or depositing metal powders which differ in composition to form an alloy variant structure. Local deposition of alloy variant materials, with mechanical and physical properties tailored to address the local application material property requirements, will avoid premature failure and increasing the useful purpose of the mold or die component part.

Conventional fabrication techniques result in a die component comprised of a common metal alloy which is subsequently heat-treated. This results in a homogenous microstructure and uniform material properties throughout the article. The variation in the process/application requirements associated with the homogenous die component/insert primarily lead to three types of failure namely; erosion, heat checking and brittle failure. Fabrication of die or mold components using the closed-loop DMD process and alloy variant materials, may be used address the local application requirements, including die component/insert configurations.

Fabrication of die or mold components using the closed-loop DMD process and alloy variant materials may be used to tailor material requirements in various applications, including injection molds, die casting, thixomolding and other, more exotic tooling.

Figure 2:
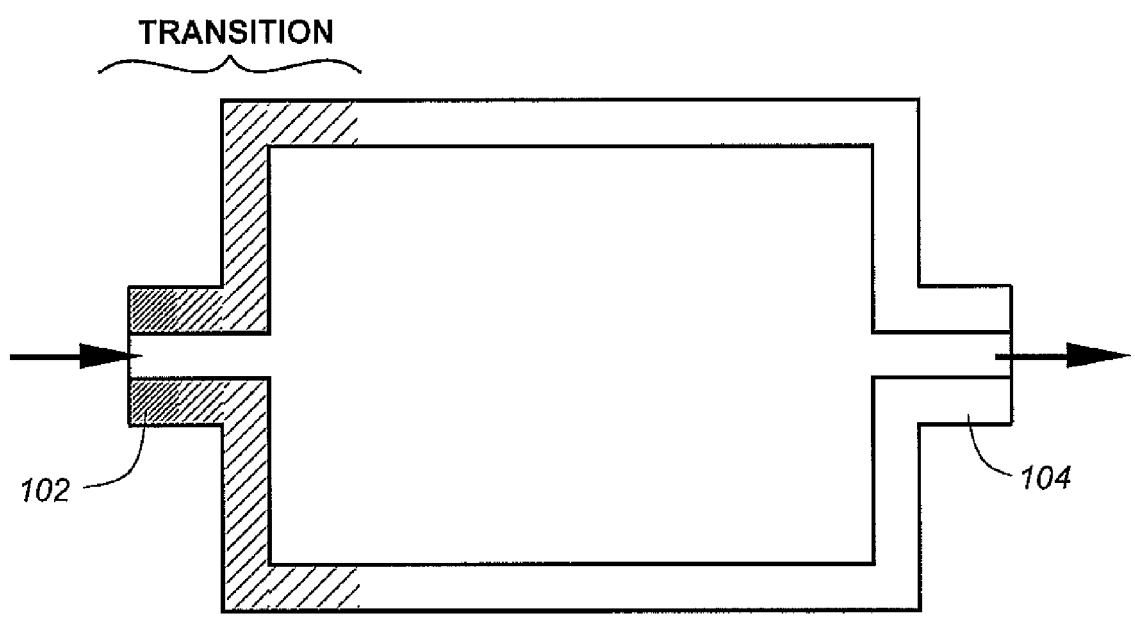
FIG. 2 is a simplified diagram representative of a die or mold to which the invention is applicable.

FIG. 2 is a highly simplified drawing representative of a die or mold, having a gate 102 through which material is introduced, and one or more ports 104 through which excess material and/or trapped gas escapes. Those of skill will readily appreciate that actual configurations are substantially more complex, and include convoluted cavities, cooling channels, sensors and complex interfaces for opening/closing to facilitate part removal.

In many applications, the gate area sees the highest velocity of material due to high-speed injection, resulting in a greater exposure to thermal gradients. Thus, it would be advantageous to utilize a higher wear material in conjunction with the gate area, but a tougher, perhaps more ductile, material in conjunction with other areas, including the interface associated with exposing the cavity. According to existing techniques, since a homogenous material must be used throughout each integral component, it is undesirable and impractical to use a high-wear throughout, since such materials tend to be brittle and unsuitable for other areas of the tool, which require greater impact resistance.

Through the use of alloy variant DMD technology, particularly closed-loop control deposition, a very precise tool may be constructed with material, composition varying from a high-wear material or alloy near the gate area, to a tougher, more impact-resistant material or alloy in conjunction with other areas of the tool. For example in die casting, where the gate area may experience heat checking through over-tempering, the gate area may be deposited using H19 steel, with a less brittle material such as H13 being used elsewhere in the tool. Moreover, through the use of DMD, the transition between materials or alloys need not be abrupt, but may vary gradually from one region to another, thereby minimizing stress and other factors that may lead to cracking or other forms of premature failure.

In thixomolding, exotic tool materials are used to cast parts containing magnesium, which would otherwise attack tools made from steel or other materials. Accordingly, niobium- and tungsten-based materials/ceramic alloys are used to coat surfaces susceptible to erosion. These materials must be used sparingly due to their expense, however, it would be advantageous to have thick layers in areas such as the gate region to increase the life of the tool. Unfortunately, with existing methods used to deposit these exotic materials, such as physical vapor deposition, flame-hardening and thermal spray techniques, true metallurgical bonds are not formed. Rather, thin coatings are applied, and although these provide for a certain level of wear and erosion resistance, they do tend to wear away and delaminate in time, resulting in the need for tool repair. The use of alloy variant DMD may be used to address this problem by fabricating true, metallurgically sound layers of a user-defined thickness in areas such as the gate region which is exposed to the greatest extremes in temperature and potential wear. Indeed, in thixomolding and other exotic processes such as vacuum die casting, the entire gate area may be made from a niobium- or other rare-earth based material or ceramic based on tungsten or other materials, with gradual transitions to other parts of the tool, as desired for impact resistance and other desirable characteristics.

In addition to a gradual transition in alloy composition in the bulk, the DMD process may alternatively be used to deposit alternate layers or rows of materials which are resistant to temperature, impact, and so forth. The resulting composite material structure has mechanical properties (i.e., yield strength, hardness and abrasion resistance) which also exceed that of the homogeneous materials and alloys which are currently used for mold materials, thereby enhancing productivity while improving part quality in these and other applications.

In some cases, the composite structure may use more than two alternating layers. For example, a structure according to the invention may be comprised of three materials, including a thermally resistant layer, an interface or transition material, and a high strength mold material, preferably tool steel. The interface or transition material may be used to provide a metallurgical bond between the dissimilar materials, thereby avoiding delamination, potential crack formation and crack propagation during functional use.

The fabrication of a thermally resistant composite material comprised of two or more pure metals or metal alloys provides the capability to maintain the required structural and abrasion resistance associated with the molding process. Fabrication of alloy variant structures according to the invention provides the capability to fabricate high-strength, high-wear, and abrasion-resistant compositions at user-defined thicknesses required for use as a mold material for both plastic and metal molding processes.

We claim:

1. A method of fabricating a die or mold, comprising the steps of:
   depositing a first metallic alloy or ceramic/metal composite on or within a gate portion of a die or mold using a laser-assisted direct metal deposition process of the type wherein a powder is fed to a melt pool under closed-loop feedback control, a gate portion being defined as an entrance through which material is introduced into the die or mold;
   depositing a second metallic alloy or ceramic/metal composite on or within portions of the die or mold other than the gate portion(s) using the closed-loop, laser-assisted direct metal deposition process; and wherein:
   the strength or impact resistance of the first metallic alloy or ceramic/metal composite is greater than the strength or impact resistance of the second metallic alloy or ceramic/metal composite, or the thermal or wear resistance of the second metallic alloy or ceramic/metal composite is greater than the thermal or wear resistance of the first metallic alloy or ceramic/metal composite.

2. The method of claim 1, wherein:

the portions of the die or mold other than the gate portion(s) includes in interface associated with opening and closing the die or mold to facilitate part removal; and the second metallic alloy or ceramic/metal composite is deposited on or within the interface.

3. The method of claim 1, wherein:

the first metallic alloy or ceramic/metal composite is H19 steel; and the second metallic alloy or ceramic/metal composite is H13 steel.

4. The method of claim 1, wherein the die or mold is used in injection molding.

5. The method of claim 1, wherein the die or mold is used in casting.

6. The method of claim 1, wherein the die or mold is used in thixomolding.

7. The method of claim 1, further including the step of changing the composition of the powder feed so that the first metallic alloy or ceramic/metal composite gradually transitions into the second metallic alloy or ceramic/metal composite.

\* \* \* \* \*